United States Patent
Hong et al.

(10) Patent No.: US 9,949,090 B2
(45) Date of Patent: Apr. 17, 2018

(54) LOCATION TRACKING SYSTEM AND METHOD

(71) Applicant: Foundation of Soongsil University-Industry Cooperation, Seoul (KR)

(72) Inventors: Jiman Hong, Seoul (KR); Sanghoon Choi, Anyang-si (KR); Eunseok Choi, Seoul (KR); Taegyu Hwang, Seoul (KR)

(73) Assignee: FOUNDATION OF SOONGSIL UNIVERSITY-INDUSTRY COOPERATION, Seoul (KR)

( * ) Notice: Subject to any disclaimer, the term of this patent is extended or adjusted under 35 U.S.C. 154(b) by 0 days.

(21) Appl. No.: 15/232,431

(22) Filed: Aug. 9, 2016

(65) Prior Publication Data
US 2017/0048678 A1 Feb. 16, 2017

(30) Foreign Application Priority Data
Aug. 10, 2015 (KR) ........................ 10-2015-0112578

(51) Int. Cl.
H04W 24/00 (2009.01)
H04W 4/04 (2009.01)
H04W 4/02 (2018.01)

(52) U.S. Cl.
CPC ............. *H04W 4/04* (2013.01); *H04W 4/023* (2013.01)

(58) Field of Classification Search
None
See application file for complete search history.

(56) References Cited

U.S. PATENT DOCUMENTS

2007/0219711 A1* 9/2007 Kaldewey ............... G01C 21/00
701/434
2009/0054076 A1* 2/2009 Evennou ............... G01S 5/0252
455/456.1
(Continued)

FOREIGN PATENT DOCUMENTS

KR 10-2012-0080489 A 7/2012
KR 10-2013-0006019 A 1/2013
(Continued)

OTHER PUBLICATIONS

Eighyun Cho et al., "An Indoor Location Trace System Using Smart Devices and Wi-Fi Infrastructure" KISM Smart Media Journal vol. 4, No. 2, pp. 68-78 (Jun. 2015).

*Primary Examiner* — German Viana Di Prisco
(74) *Attorney, Agent, or Firm* — Novick, Kim & Lee, PLLC; Sang Ho Lee

(57) ABSTRACT

Provided is a location tracking system and a method of operating the location tracking system. The location tracking system selects either an indoor location tracking mode or an outdoor location tracking mode according to whether a user is currently indoors or outdoors and tracks the location of the user. The location tracking system tracks an indoor location of the user using access point (AP) signal intensity information and a step detection technique when tracking the location of a user in the indoor location tracking mode, and tracks the outdoor location of a user using a global positioning system (GPS) and a step detection technique when tracking the location of the user in the outdoor location tracking mode.

18 Claims, 12 Drawing Sheets

(56) References Cited

U.S. PATENT DOCUMENTS

| | | | | |
|---|---|---|---|---|
| 2011/0172906 A1* | 7/2011 | Das | ........................ | G01C 21/20 |
| | | | | 701/533 |
| 2011/0306354 A1* | 12/2011 | Ledlie | .................... | G01S 5/0252 |
| | | | | 455/456.1 |
| 2012/0007779 A1* | 1/2012 | Klepal | ................... | G01S 5/0252 |
| | | | | 342/451 |
| 2013/0311084 A1 | 11/2013 | Lundquist et al. | | |
| 2014/0045535 A1* | 2/2014 | Dai | ........................ | H04W 4/043 |
| | | | | 455/456.3 |
| 2014/0114568 A1* | 4/2014 | Park | ...................... | G01S 5/0263 |
| | | | | 701/469 |
| 2014/0141796 A1* | 5/2014 | Marti | .................... | G01S 5/0252 |
| | | | | 455/456.1 |
| 2015/0031390 A1* | 1/2015 | Robertson | ............ | G01C 21/165 |
| | | | | 455/456.1 |
| 2015/0365806 A1* | 12/2015 | Parviainen | ............ | G06F 3/0346 |
| | | | | 455/457 |
| 2016/0080911 A1* | 3/2016 | Kay | ........................ | H04W 4/04 |
| | | | | 455/456.1 |
| 2017/0038213 A1* | 2/2017 | Han | ........................ | G01C 21/16 |

FOREIGN PATENT DOCUMENTS

| | | |
|---|---|---|
| KR | 10-1269733 B1 | 5/2013 |
| KR | 10-1417624 B1 | 7/2014 |
| KR | 10-2015-0070263 A | 6/2015 |

* cited by examiner

LOCATION TRACKING SYSTEM AND METHOD

CROSS-REFERENCE TO RELATED APPLICATION

This application claims priority to and the benefit of Korean Patent Application No. 10-2015-0112578, filed on Aug. 10, 2015, the disclosure of which is incorporated herein by reference in its entirety.

BACKGROUND

1. Field of the Invention

The present invention relates to a location tracking system and method, and more particularly, to a location tracking system and method for tracking a location of a user indoors and outdoors.

2. Discussion of Related Art

Current location tracking technology is a core technology of a ubiquitous society, and research is under way on technologies for tracking a location of a user using various communication methods.

Automatic navigation devices using global positioning system (GPS) satellites or positioning services based on mobile communications networks are widely known technologies. However, a technology for tracking a location using a GPS satellite exhibits very low accuracy and has many difficulties in being used indoors and in radio shadow areas. Recently, indoor and short-range location tracking technologies employing various communication technologies, such as wireless fidelity (WiFi), ultra wideband (UWB), Bluetooth, radio frequency identification (RFID), and the like, are being researched. Unlike GPS, the aforementioned technologies have limitations in location tracking in a wide outdoor area but can acquire location tracking information with high accuracy in a small area.

Here, there are largely two technologies for estimating an indoor location of a user. The technologies employ a method of estimating a current location of a user by analyzing the intensity of a communication signal, such as a WiFi signal, and a method of estimating a movement distance and direction of a user using a sensor.

As described above, existing location tracking methods have been separately specialized for indoor use and outdoor use and separately researched and developed. Accordingly, an existing location tracking method does not allow both indoor and outdoor location tracking.

Consequently, a location tracking method for tracking a location of a user both indoors and outdoors is necessary.

SUMMARY OF THE INVENTION

The present invention is directed to providing a location tracking system and method for selecting either an indoor location tracking mode or an outdoor location tracking mode, according to whether a user is currently indoors or outdoors; and tracking the location of the user.

According to an aspect of the present invention, there is provided a location tracking method including: generating an indoor map showing a plurality of nodes capable of indicating access point (AP) signal intensity information received from a mobile terminal and distance and direction information of respective sections in which a person is able to move inside of a building; and determining whether a user is inside or outside of the building through a node shown in the indoor map to set a location tracking mode to an indoor location tracking mode or an outdoor location tracking mode and tracking a location of the user in the set location tracking mode.

The development of the indoor map may include: extracting indoor geographic information and indoor structure information from pre-stored geographical map information; constructing an indoor geographical location model of the inside of the building using the indoor geographic information and the indoor structure information; detecting a space in which a person is able to move on the indoor geographical location model using the indoor structure information; displaying two arbitrary nodes in the detected space; displaying a connection line connecting the two arbitrary nodes; detecting location information of the two arbitrary nodes using the indoor geographic information; calculating direction and distance information of the connection line with the location information of the two arbitrary nodes; generating an edge by mapping the direction and distance information of the connection line to the connection line; and generating the indoor map by displaying the generated edge on the indoor geographical location model.

The development of the indoor map may include: detecting AP signal intensity information corresponding to the plurality of nodes generated on the indoor geographical location model in the AP signal intensity information received from the mobile terminal; and mapping the corresponding AP signal intensity information to the plurality of nodes generated on the indoor geographical location model to generate the indoor map.

Determining whether the user is inside or outside of the building through the node may include: receiving initial AP signal intensity information from the mobile terminal when a location tracking service is started; determining whether there is AP signal intensity information identical to the initial AP signal intensity information in the AP signal intensity information mapped to the indoor map; determining that the user is indoors when there is AP signal intensity information identical to the initial AP signal intensity information in the AP signal intensity information mapped to the indoor map; and determining that the user is outdoors when there is no AP signal intensity information identical to the initial AP signal intensity information in the AP signal intensity information mapped to the indoor map.

Tracking the location of the user in the indoor location tracking mode may include: receiving initial indoor AP signal intensity information from the mobile terminal at a point in time when starting to track the location of the user in the indoor location tracking mode; detecting an initial node indicating an initial indoor location of the user by comparing the AP signal intensity information mapped to the indoor map with the initial indoor AP signal intensity information; receiving acceleration information from the mobile terminal and determining whether the user moves; and tracking an indoor location of the user based on the initial node by calculating a displacement of the user when the user moves.

Tracking the indoor location of the user may include: detecting an edge corresponding to the displacement of the user based on the initial node of the user; calculating a difference between a movement direction according to the displacement of the user and a direction of the detected edge; determining whether the calculated difference is within a predetermined range; not moving the location of the user when the calculated difference exceeds the predetermined range; and tracking the location of the user by moving the location of the user according to the displacement of the user when the calculated difference is within the predetermined range.

Tracking the location of the user by moving the location of the user according to the displacement of the user may include: determining whether the user passes another node on the indoor map due to the location movement according to the displacement of the user; determining whether the location moved according to the displacement of the user is identical to a location of the other node when the user passes the other node; and correcting the location of the user with the location of the other node to track the location of the user when the location moved according to the displacement of the user is not identical to the location of the other node.

The location tracking method may further include: determining whether the user moves to a preset indoor exit edge generated as a door node while tracking the indoor location of the user; and when the user moves to the preset indoor exit edge, recognizing that the user moves from the inside to the outside of the building, switching the location tracking mode from the indoor location tracking mode to the outdoor location tracking mode, and tracking the location of the user.

Tracking the location of the user in the outdoor location tracking mode may include: detecting an initial outdoor location of the user using a global positioning system (GPS); receiving acceleration information from the mobile terminal and determining whether the user moves; and tracking the location of the user by calculating a displacement of the user when the user moves.

Tracking the location of the user by calculating the displacement of the user may include: determining whether a distance moved by the user from the initial outdoor location of the user according to the displacement of the user is within a predetermined distance; tracking the location of the user by moving the location of the user according to the displacement of the user when the distance moved by the user from the initial outdoor location of the user is within the predetermined distance; and tracking the location of the user using the GPS when the distance moved by the user from the initial outdoor location of the user exceeds the predetermined distance.

The location tracking method may further include: determining whether an AP signal intensity corresponding to a preset door node is detected while tracking an outdoor location of the user; and recognizing that the user moves from the outside to the inside of the building, switching the location tracking mode from the outdoor location tracking mode to the indoor location tracking mode, and tracking the location of the user when the AP signal intensity corresponding to the preset door node is detected.

According to another aspect of the present invention, there is provided a location tracking system including: a mobile terminal configured to receive signals from APs around a user, measure an AP signal intensity, and transmit information on the measured AP signal intensities to an outside; and a server configured to generate an indoor map showing a plurality of nodes capable of indicating the AP signal intensity information received from the mobile terminal and distance and direction information of respective indoor sections in which a person is able to move, determine whether the user is indoors or outdoors through a node shown in the indoor map, set a location tracking mode to an indoor location tracking mode or an outdoor location tracking mode, and track a location of the user in the set location tracking mode.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
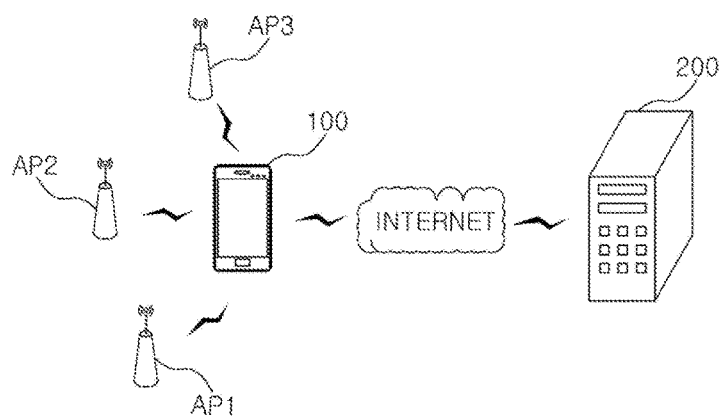
FIG. 1 is a diagram showing a location tracking system according to an exemplary embodiment of the present invention.

The following detailed description of the present invention refers to the accompanying drawings which show, by way of illustration, exemplary embodiments in which this invention may be practiced. These embodiments are described in sufficient detail to enable those of ordinary skill in the art to practice the present invention. Various embodiments of the present invention are to be understood as being different but not necessarily as being mutually exclusive. For example, where a particular shape is described, the structure and properties can be made in the context of an embodiment implemented in other embodiments without departing from the spirit and scope of the invention. In addition, the individual components within each disclosed embodiment or position are to be understood as being an arrangement that can be changed without departing from the spirit and scope of the invention. Therefore, the description is not to be taken as limiting to the scope of the present invention, and instead the scope of the present invention is limited only by the appended claims along with the full range equal to those claims. In the drawings, similar reference symbols denote the same or similar functionality throughout the various aspects.

Hereinafter, exemplary embodiments of the present invention will be described in detail with reference to the drawings.

FIG. 1 is a diagram showing a location tracking system according to an exemplary embodiment of the present invention.

A location tracking system 1 according to an exemplary embodiment of the present invention may include a mobile terminal 100 and a server 200.

The mobile terminal 100 may measure signal intensities of signals received from surrounding access points (APs) at a current location. The mobile terminal 100 may transmit information on the measured AP signal intensities to the server 200.

Also, when a user moves, the mobile terminal 100 may measure acceleration using a sensor provided therein. The mobile terminal 100 may transmit information on the measured acceleration to the server 200.

The server 200 may make an indoor map using the AP signal intensity information received from the mobile terminal 100 and pre-stored geographical map information. The server 200 may set a location tracking mode to an indoor location tracking mode or an outdoor location tracking mode according to an initial location of the user, and track a location of the user. At this time, the server 200 may track the location of the user using a step detection technique along with wireless fidelity (WiFi) fingerprinting when the location tracking mode is set to the indoor location tracking mode, and may track the location of the user using a step detection technique along with a global positioning system (GPS) when the location tracking mode is set to the outdoor location tracking mode.

Figure 2:
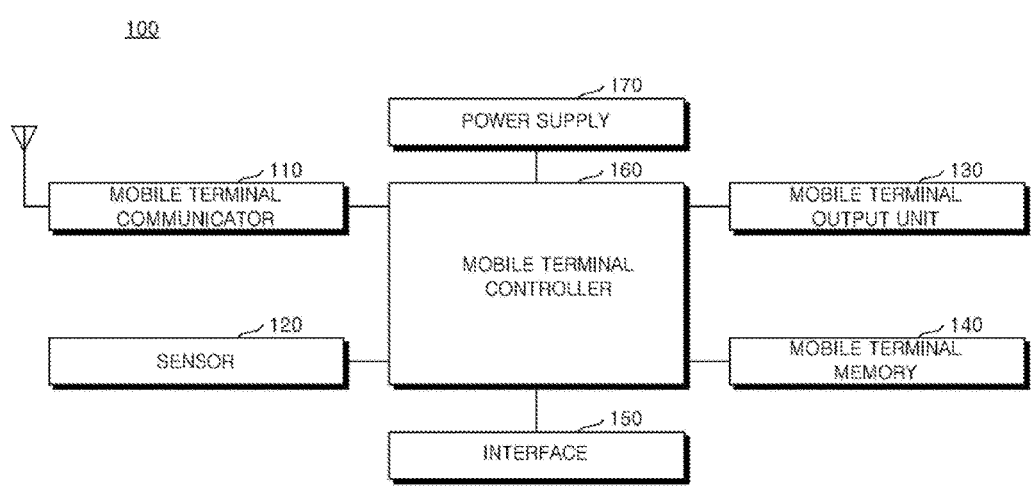
FIG. 2 is a block diagram of a mobile terminal shown in FIG. 1.

FIG. 2 is a block diagram of a mobile terminal shown in FIG. 1.

Referring to FIG. 2, the mobile terminal 100 according to an exemplary embodiment of the present invention may include a mobile terminal communicator 110, a sensor 120, a mobile terminal output unit 130, a mobile terminal memory 140, an interface 150, a mobile terminal controller 160, and a power supply 170.

The mobile terminal communicator 110 may measure signal intensities from surrounding APs present indoors. The mobile terminal communicator 110 may transmit information on the measured AP signal intensities to the server 200. The mobile terminal communicator 110 may implement common wireless communication including WiFi communication, ZigBee communication, and so on.

The sensor 120 may include an acceleration sensor. The acceleration sensor may measure acceleration of the mobile terminal 100. The acceleration sensor may measure acceleration with respect to three axes. The sensor 120 may transmit information on the measured acceleration to the server 200 through the mobile terminal communicator 110.

The mobile terminal output unit 130 may output an audio signal, a video signal, or an alarm signal. The mobile terminal output unit 130 according to an exemplary embodiment of the present invention may output an alarm signal when a signal is received from an AP.

The mobile terminal memory 140 may store a program necessary for the mobile terminal 100 to operate.

The interface 150 may serve as an interface between the mobile terminal 100 and all external devices connected to the mobile terminal 100. For example, the interface 150 may include a wired/wireless headset port, an external charger port, a wired/wireless data port, a memory card port, a port for connecting to a device having an identification (ID) module, an audio input/output (I/O) port, a video I/O port, an earphone port, and so on.

Here, the ID module is a chip which stores various kinds of information for authenticating a right to use the mobile terminal 100, and may include a user authentication module, a subscriber authentication module, a general-use user authentication module, and so on. The device having the ID module may be manufactured in the form of a smart card.

The mobile terminal controller 160 may perform control so that information on AP signal intensities measured by the mobile terminal communicator 110 and the information on the acceleration measured by the sensor 120 are transmitted to the server 200. Here, the mobile terminal controller 160 may divide an indoor space into certain grids and assign coordinate pairs to the grids. The mobile terminal controller 160 may map information on signal intensities from surrounding APs to every coordinate pair in the space. The mobile terminal controller 160 may perform control so that AP signal intensity information obtained by mapping signal intensity information of the surrounding APs to every coordinate pair is transmitted to the server 200.

Under control of the mobile terminal controller 160, the power supply 170 may receive external power or internal power and supply power necessary for each component to operate.

Figure 3:
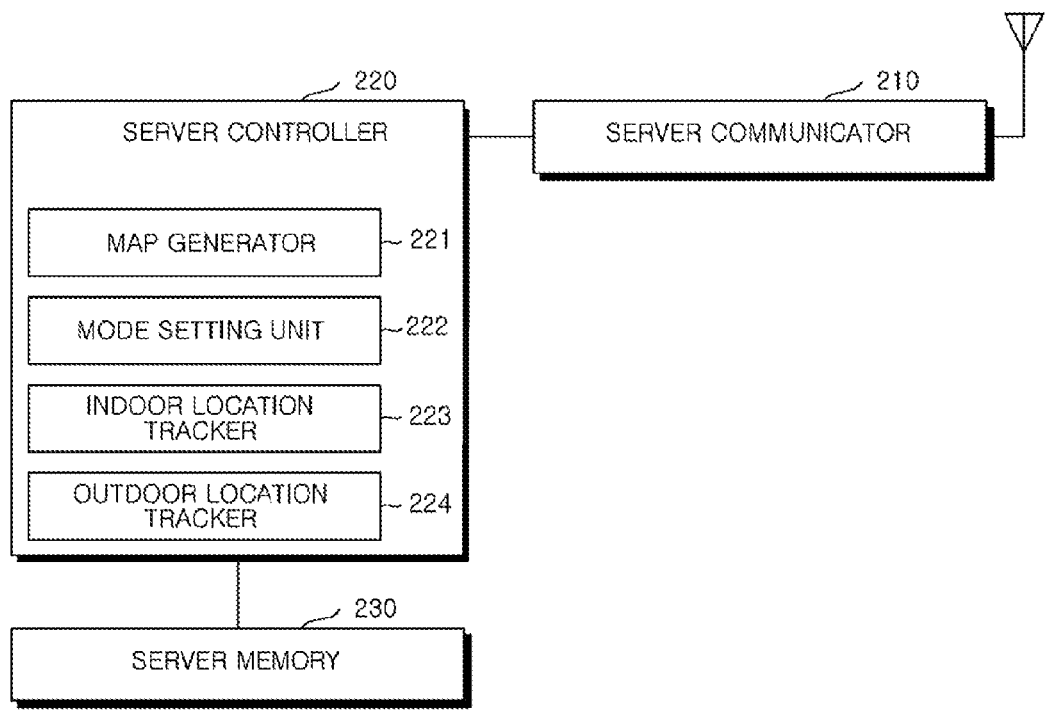
FIG. 3 is a detailed block diagram of a server shown in FIG. 1.
Figure 4:
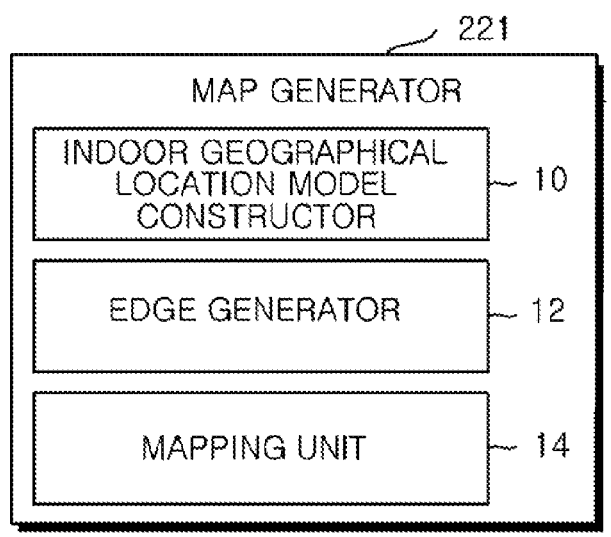
FIG. 4 is a detailed block diagram of a map generator shown in FIG. 3.
Figure 5:
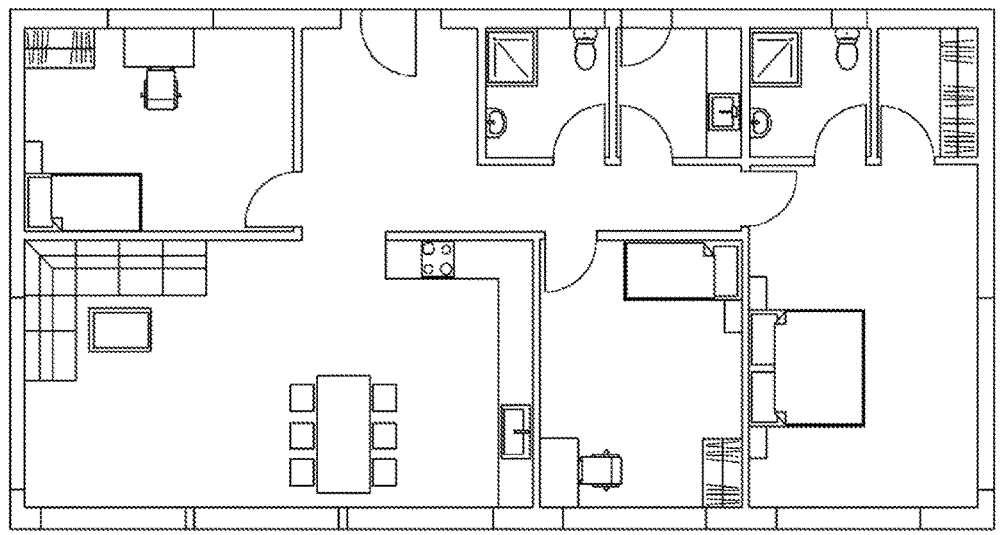
FIG. 5 shows an example of an indoor map generated by a map generator according to an exemplary embodiment of the present invention.
Figure 6:
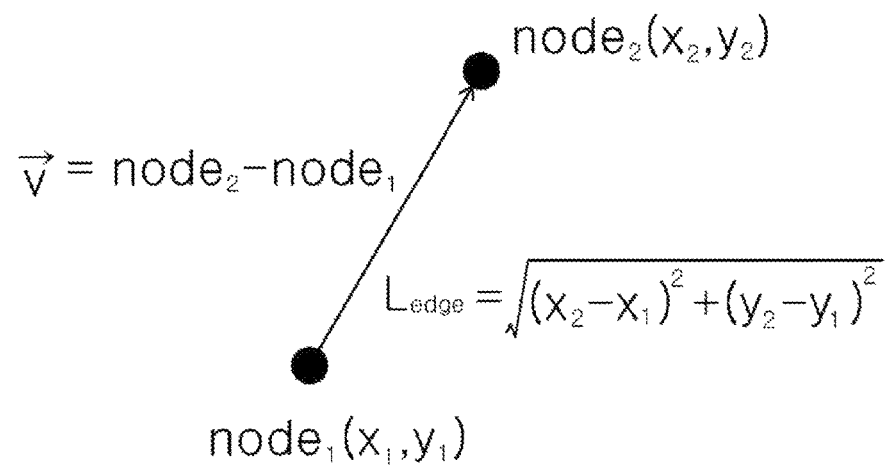
FIG. 6 is a diagram illustrating an operating method of an edge generator shown in FIG. 4.
Figure 7:
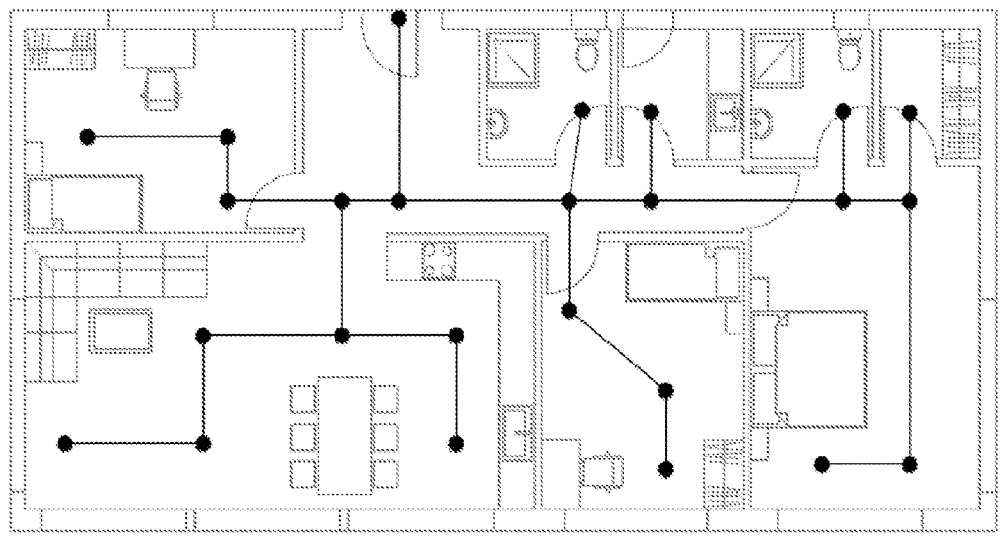
FIG. 7 is a diagram obtained by combining the indoor map of FIG. 5 and edges.

FIG. 3 is a detailed block diagram of a server shown in FIG. 1, FIG. 4 is a detailed block diagram of a map generator shown in FIG. 3, FIG. 5 shows an example of an indoor map generated by a map generator according to an exemplary embodiment of the present invention, FIG. 6 is a diagram illustrating an operating method of an edge generator shown in FIG. 4, and FIG. 7 is a diagram obtained by combining the indoor map of FIG. 5 and edges.

Referring to FIG. 3, the server 200 according to an exemplary embodiment of the present invention may track a location of a user using AP signal intensity information and acceleration information received from the mobile terminal 100. To this end, the server 200 may include a server communicator 210, a server controller 220, and a server memory 230.

The server communicator 210 may receive the AP signal intensity information and the acceleration information from the mobile terminal 100 by performing wireless communication with the mobile terminal 100. The server communicator 210 may transfer the received AP signal intensity information and acceleration information to the server controller 220.

The server controller 220 may generate an indoor map using the AP signal intensity information received from the mobile terminal 100 and pre-stored geographical map information, and track the location of the user in one of the indoor location tracking mode and the outdoor location tracking mode according to the location of the user. To this end, the server controller 220 may include a map generator 221, a mode setting unit 222, an indoor location tracker 223, and an outdoor location tracker 224.

The map generator 221 may generate the indoor map for tracking an indoor location of the user using the received AP signal intensity information and the geographical map information pre-stored in the server memory 230. To this end, referring to FIG. 4, the map generator 221 may include an indoor geographical location model constructor 10, an edge generator 12, and a mapping unit 14.

The indoor geographical location model constructor 10 may construct an indoor geographical location model using the geographical map information pre-stored in the server memory 230.

Specifically, from the received AP signal intensity information and a geographical map pre-stored in the server memory 230, the indoor geographical location model constructor 10 may extract size and shape information of a building whose indoor map will be made. Here, the geographical map pre-stored in the server memory 230 denotes a map of an indoor location tracking service currently in practical use and may include geographical location and size information, shape information, and the like of buildings. The indoor geographical location model constructor 10 may extract the size and shape information of the building whose indoor map will be made from the server memory 230. Here, indoor structure information of the building may be provided by the user or a constructor of the building and stored. The indoor geographical location model constructor 10 may construct an indoor geographical location model of the building whose indoor map will be made using the size and shape information of the building extracted from the geographical map pre-stored in the server memory 230. The indoor geographical location model constructor 10 may extract stored indoor structure information of the building mapped to the building from the server memory 230. Here, the indoor structure information may be surveyed information actually measured in advance by a constructor or the user. The indoor geographical location model constructor 10 may construct an indoor geographical location model of the building as shown in FIG. 5 by modeling the inside of the building based on the extracted indoor structure information of the building.

The edge generator 12 may generate edges indicating direction and distance information about the indoor geographical location model constructed by the indoor geographical location model constructor 10.

Specifically, the edge generator 12 may generate edges which may represent ways or passages through which a person can move in the building. Here, the edges are shown on an indoor map to estimate an indoor location and may include direction information and distance information. Referring to FIG. 6, according to an edge generation method, two arbitrary nodes may be selected, and an edge may be generated by connecting the two nodes. Here, by calculating a difference in location between the two nodes, it is possible to acquire direction and distance information of the edge. According to the edge generation method described above, the edge generator 12 may generate edges for the indoor geographical location model constructed by the indoor geographical location model constructor 10. More specifically, the edge generator 12 may detect a space in which a person can move in the indoor geographical location model constructed by the indoor geographical location model constructor 10. Here, the space in which a person can move in the indoor geographical location model may denote an empty space in which there are no obstacles, such as a wall, furniture, and the like, according to the indoor structure information obtained by actually measuring the inside of the building. The edge generator 12 may select two arbitrary nodes in the space in which a person can move in the indoor geographical location model. The edge generator 12 may generate an edge by connecting two arbitrary nodes selected on the indoor geographical location model. Since the indoor geographical location model includes the size information and the geographical location information of the building, location information of the two nodes selected on the indoor geographical location model can be known. Accordingly, when the edge is generated by connecting the two nodes, direction and distance information of the generated edge can be calculated. By repeating a process of generating an edge on the indoor geographical location model, the edge generator 12 may generate edges on the indoor geographical location model as shown in FIG. 7.

Meanwhile, nodes selected on the indoor geographical location model may be a predetermined distance, or more, from each other. The predetermined distance between nodes according to an exemplary embodiment of the present invention may be 5 m. As will be described below, when AP signal intensity information is mapped to nodes generated on the indoor geographical location model, it is difficult to distinguish between two nodes with AP signal intensities if the distance between the two nodes is very close due to WiFi AP signals changing in real time. Therefore, two arbitrary nodes are generated at the predetermined distance or more from each other so that the two nodes can be distinguished from each other.

When the edge generator 12 according to an exemplary embodiment of the present invention generates nodes on the indoor geographical location model, it may generate the nodes in consideration of doors present in the building. Referring to FIG. 7, when a person moves to a divided indoor sub-space, such as a bathroom or a study, the person moves through a door provided at the sub-space. Accordingly, when edges are generated based on doors, it is possible to accurately track a person moving to a sub-space such as a room. For this reason, the edge generator 12 may generate nodes at doors present indoors and generate other nodes at the predetermined distance or more from the generated door nodes.

The mapping unit 14 may map the information of AP signal intensities measured by the mobile terminal 100 onto the indoor geographical location model on which edges have been generated to generate an indoor map.

Specifically, the mapping unit 14 may receive, from the mobile terminal 100, AP signal intensity information according to coordinate pairs of the inside of the building whose indoor map will be made. The mapping unit 14 may detect AP signal intensity information corresponding to coordinate pairs of nodes generated by the edge generator 12. The mapping unit 14 may map the corresponding AP signal intensity information to the nodes generated in the inner space of the building.

The mode setting unit 222 according to an exemplary embodiment of the present invention may set a location tracking mode according to an initial location of the user at a point in time when location tracking is started, and may sense the user moving from the inside to the outside of a building or from the outside to the inside of the building and switch the location tracking mode to a location tracking mode appropriate to a location of the user.

Specifically, the mode setting unit 222 according to an exemplary embodiment of the present invention receives signal intensity information of surrounding APs from the mobile terminal 100 at a point in time when a location tracking service is started. The mode setting unit 222 may compare the received AP signal intensity information with AP signal intensity information pre-stored by the map generator 221 regarding the inside of a building to determine whether there is AP signal intensity information identical to the AP signal intensity information received upon starting the location tracking service in indoor AP signal intensity information. When there is AP signal intensity information identical to the AP signal intensity information received upon starting the location tracking service in the indoor AP signal intensity information, the mode setting unit 222 may determine that the mobile terminal 100 is indoors when the location tracking service is started. Conversely, when there is no AP signal intensity information identical to the AP signal intensity information received upon starting the location tracking service, the mode setting unit 222 may determine that the mobile terminal 100 is outdoors. The mode setting unit 222 may set the location tracking mode to the indoor location tracking mode when it is determined that the mobile terminal 100 is indoors, and may set the location tracking mode to the outdoor location tracking mode when it is determined that mobile terminal 100 is outdoors.

The mode setting unit 222 according to another exemplary embodiment of the present invention may determine whether a user is indoors or outdoors using the GPS. Specifically, the model setting unit 222 may locate the user through the GPS at a point in time when a location tracking service is started. The mode setting unit 222 may determine that the user is indoors when the location of the user detected on a map through the GPS is in a building shown on the map, and may determine that the user is outdoors when the location of the user is outside of buildings.

Meanwhile, an operation in which the mode setting unit 222 switches location tracking modes when a user moves from the inside to the outside of a building or from the outside to the inside of the building will be described below through the indoor location tracker 223 and the outdoor location tracker 224.

Figure 8:
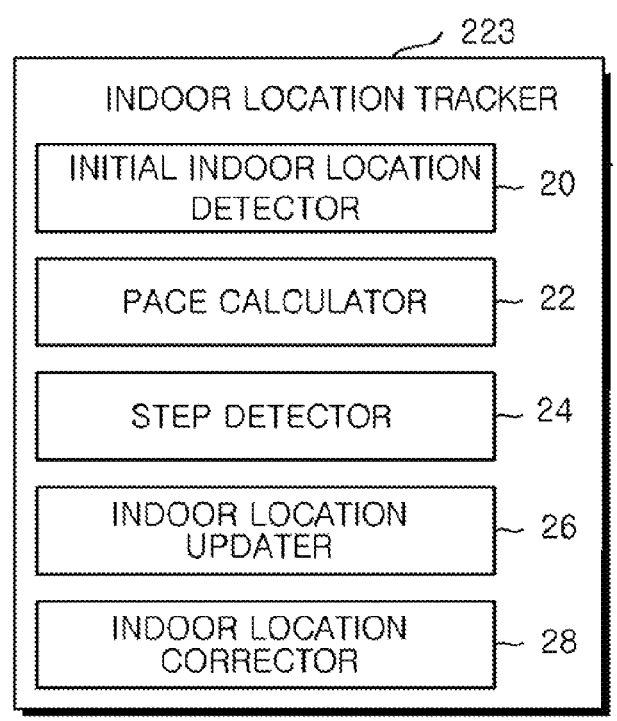
FIG. 8 is a detailed block diagram of an indoor location tracker shown in FIG. 3.
Figure 9:
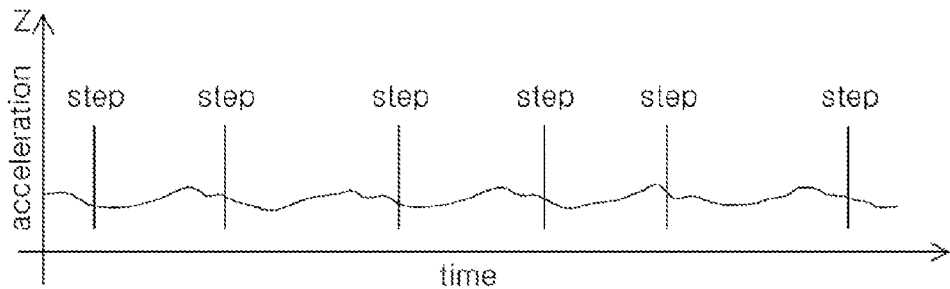
FIG. 9 is a graph showing changes in acceleration on a z-axis while a user walks.
Figure 10:
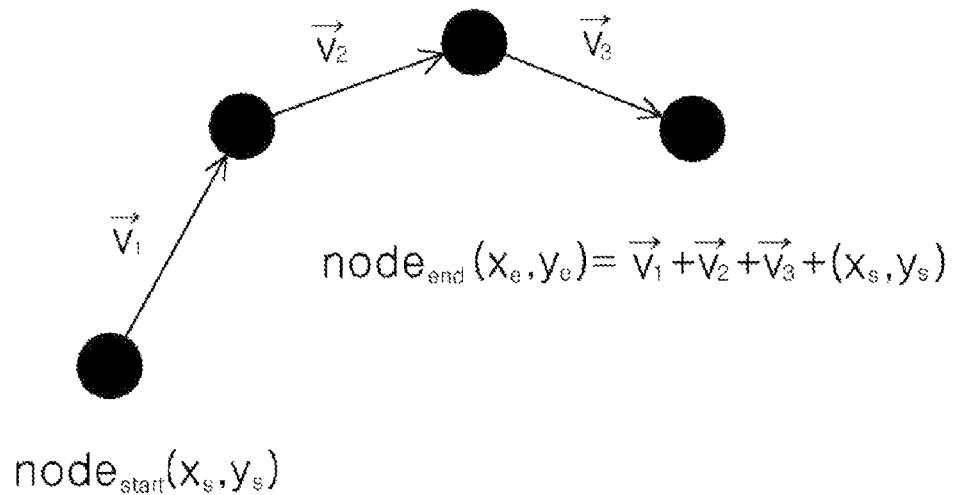
FIG. 10 is a diagram illustrating a method of updating an indoor location through detection of steps of a user.
Figure 11:
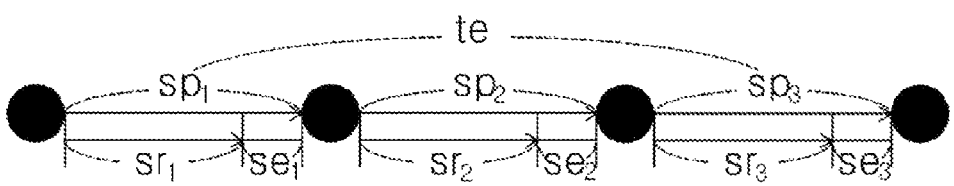
FIG. 11 is a diagram illustrating an error resulting from detection of steps of a user.
Figure 12:
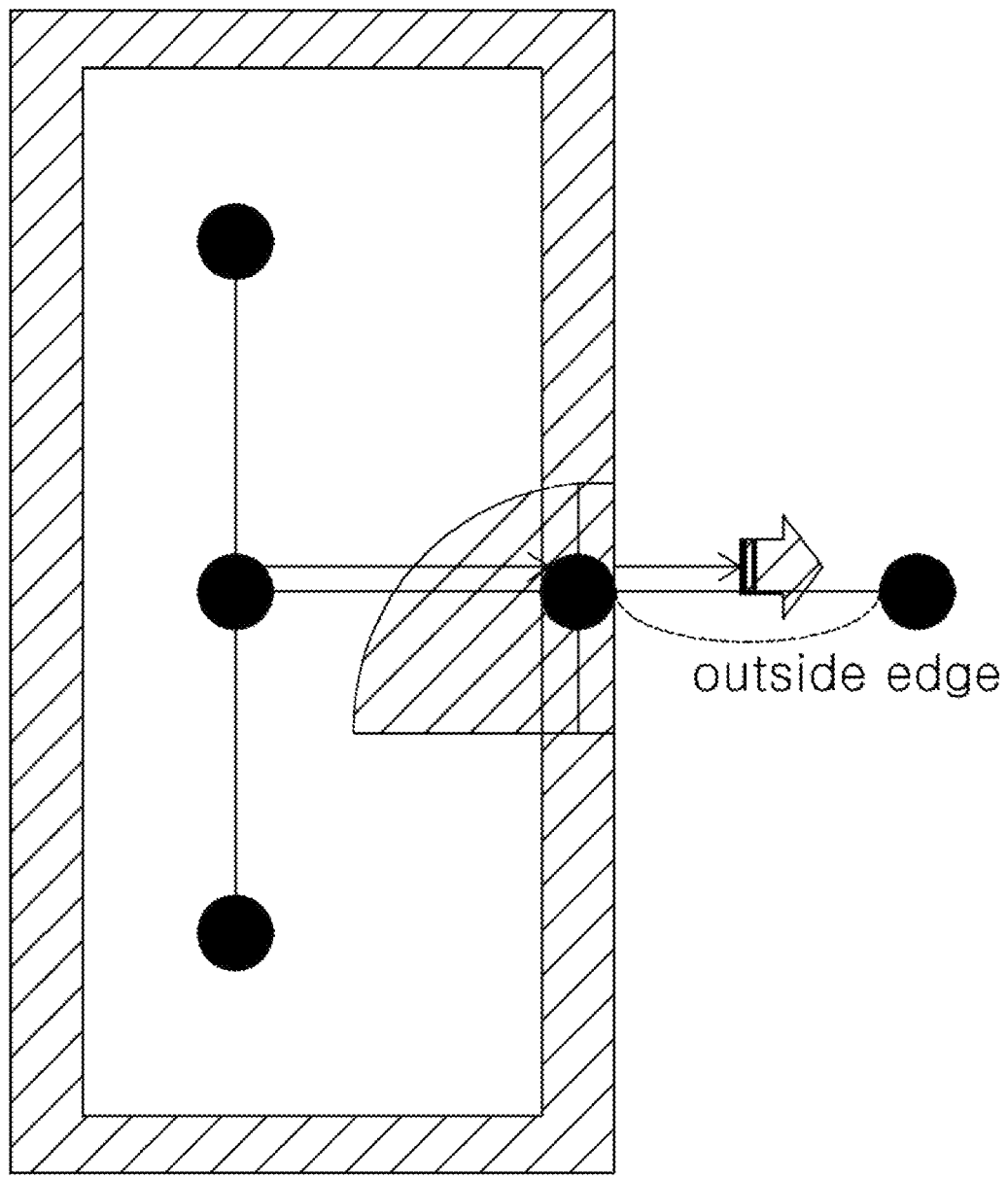
FIG. 12 is a diagram illustrating a method of recognizing an inside-to-outside movement.

FIG. 8 is a detailed block diagram of an indoor location tracker shown in FIG. 3, FIG. 9 is a graph showing changes in acceleration on a z-axis while a user walks, FIG. 10 is a diagram illustrating a method of updating an indoor location through detection of steps of a user, FIG. 11 is a diagram illustrating an error resulting from detection of steps of a user, and FIG. 12 is a diagram illustrating a method of recognizing an inside-to-outside movement.

The indoor location tracker 223 may track a location of the user when the mode setting unit 222 sets or switches the location tracking mode to the indoor location tracking mode. The indoor location tracker 223 may track the location of the user using a step detection technique and AP signal intensity information. To this end, referring to FIG. 8, the indoor location tracker 223 may include an initial indoor location detector 20, a pace calculator 22, a step detector 24, an indoor location updater 26, and an indoor location corrector 28.

The initial indoor location detector 20 may detect an initial indoor location using information on signal intensities of surrounding APs measured by the mobile terminal 100 when indoor location tracking is started. Here, the initial indoor location detector 20 may compare the information on AP signal intensities measured upon starting the indoor location tracking with AP signal intensity information mapped to nodes in an indoor space and stored by the mapping unit 14 to detect the initial indoor location of the user. Here, a node corresponding to an AP signal intensity may be detected as the initial indoor location.

After detecting an initial indoor location with AP signal intensity information, the indoor location tracker 223 according to an exemplary embodiment of the present invention may sense steps of the user based on the detected initial indoor location and track an indoor location of the user. Meanwhile, it is necessary to extract pace information of the user first to sense steps of the user and track the indoor location of the user. Accordingly, the pace calculator 22 may calculate a pace corresponding to the user. The pace calculator 22 according to an exemplary embodiment of the present invention assumes that a pace of a person depends on his or her sex and height, and may calculate the pace of the user by calculating an average pace according to a sex and height of the user. The pace calculator 22 may calculate a pace by $W_m$=height (cm)×0.41 in the case of a male, and by $W_w$=height (cm)×0.413 in the case of a female.

The step detector 24 may detect steps of the user according to acceleration measured by the sensor 120 provided in the mobile terminal 100.

Specifically, the step detector 24 may determine acceleration on a z-axis from the acceleration received from the mobile terminal 100. Meanwhile, usually, acceleration is generated in a positive direction of the z-axis when a person raises his or her foot while walking, and acceleration is generated in a negative direction when the person takes a step forward. The step detector 24 may define changes in z-axis acceleration, which are generally shown as described above, when a person walks as a walking acceleration change pattern. Referring to FIG. 9, when the defined walking acceleration change pattern is obtained, the step detector 24 may recognize that the user has made one step and detect the step of the user.

When the step of the user is detected by the step detector 24, the indoor location updater 26 may update the location of the user based on the initial location of the user detected by the initial indoor location detector 20.

Specifically, when the step of the user is detected by the step detector 24, the indoor location updater 26 may measure a displacement of the user. Here, an operation of measuring a displacement of a user may include an operation of measuring a movement direction in which a user moves using information on an acceleration measured by the mobile terminal 100 and an operation of measuring a movement distance that the user has moved using pace information of the user calculated by the pace calculator 22 and the number of steps of the user detected by the step detector 24. Every time the user moves, the indoor location updater 26 may measure a displacement of the user and update the indoor location of the user as shown in FIG. 10.

Meanwhile, when the indoor location of the user is tracked through detection of the step of the user, a direction error or a distance error may occur. Therefore, to correct an error which may occur when the indoor location is tracked through step detection, the indoor location corrector 28 may determine whether the indoor location updater 26 updates the indoor location of the user using AP signal intensity information or edge information to correct the indoor location of the user. Here, a direction error may be caused when a compass sensor used to detect a step direction is affected by machines with magnetism, and a distance error may be an error occurring in every step due to a difference between an average pace and an actual pace or a pace error occurring when a step is not detected due to different walking characteristics among individuals.

The indoor location corrector 28 may correct the indoor location using an edge or AP signal intensity information.

First, an operation in which the indoor location corrector 28 corrects the indoor location of the user using an edge is an operation of determining whether the user has made one step through a directional comparison with the edge and correcting the indoor location. Specifically, the indoor location corrector 28 may detect an edge along which the user is walking among a plurality of edges generated by the edge generator 12 based on the initial indoor location of the user. The indoor location corrector 28 may compare a direction of the detected edge with the step direction of the user measured by the indoor location updater 26. When a difference between the direction of the detected edge and the step direction of the user exceeds a predetermined range, the indoor location corrector 28 may recognize that the corresponding step is an invalid step. Conversely, when the difference between the direction of the detected edge and the step direction of the user is within the predetermined range, the indoor location corrector 28 may recognize that the corresponding step is a valid step and cause the indoor location updater 26 to update the indoor location of the user.

Here, an operation of determining whether the difference between the direction of the detected edge and the step direction of the user exceeds the predetermined range may be an operation of determining whether the difference between the edge direction and the step direction of the user is within a range of −45° to +45°.

Also, according to a method of updating an indoor location of a user through step detection, a pace of the user is calculated as an average according to the sex and height of the user as shown in FIG. 11, and thus an error may occur due to a difference between an estimated pace $sp_k$ and an actual pace $sr_k$ or differences in pace among individuals. Even when a difference $se_k$ between the estimated pace $sp_k$ and an actual pace $sr_k$ is very small, the difference $se_k$ is accumulated (te=$\Sigma se_k$) with an increase in the number of steps so that a great error may occur. Thus, the indoor location corrector 28 may correct the indoor location using AP signal intensity information.

Specifically, to correct a distance error, the indoor location corrector 28 may check an AP signal intensity pre-stored in each node shown on a map every time the user passes through the corresponding node during movement of the user and detect location information of the corresponding AP node with an AP signal intensity of the corresponding node. The indoor location corrector 28 may determine whether the location of the user updated according to a displacement of the user estimated according to a calculated pace and detected steps is identical to a location according to the AP signal intensity of the corresponding node. When the location of the user is updated according to the estimated displacement of the user, and is not identical to the location according to the AP signal intensity of the corresponding node, the indoor location corrector 28 may correct the location of the user with the location corresponding to the node.

While tracking the indoor location of the user, the indoor location tracker 223 according to an exemplary embodiment of the present invention may detect the user moving from the inside to the outside of a building.

Specifically, when it is sensed that the user passes through a predetermined door node which distinguishes between the inside and the outside of the building and moves to a predetermined indoor exit edge as shown in FIG. 12 while the indoor location updater 26 is updating the indoor location through detection of the steps of the user, the indoor location updater 26 may determine that the user moves from the inside to the outside of the building. Here, while generating nodes, the map generator 221 may generate a node at a door provided to exit the inside of the building according to an indoor structure of the building and designate the node generated at the door as a door node which distinguishes between the inside and the outside of the building to determine the predetermined door node which distinguishes between the inside and the outside of the building. Also, after the door node which distinguishes between the inside and the outside is generated, one more node may be generated outdoors based on the door, and then an edge may be generated between the node generated outdoors and the door node which distinguishes between the inside and the outside. The predetermined indoor exit edge may denote the generated edge.

When the indoor location updater 26 determines that the user moves from the inside to the outside of a building, the mode setting unit 222 according to an exemplary embodiment of the present invention may switch the location tracking mode from the indoor location tracking mode to the outdoor location tracking mode.

Figure 13:
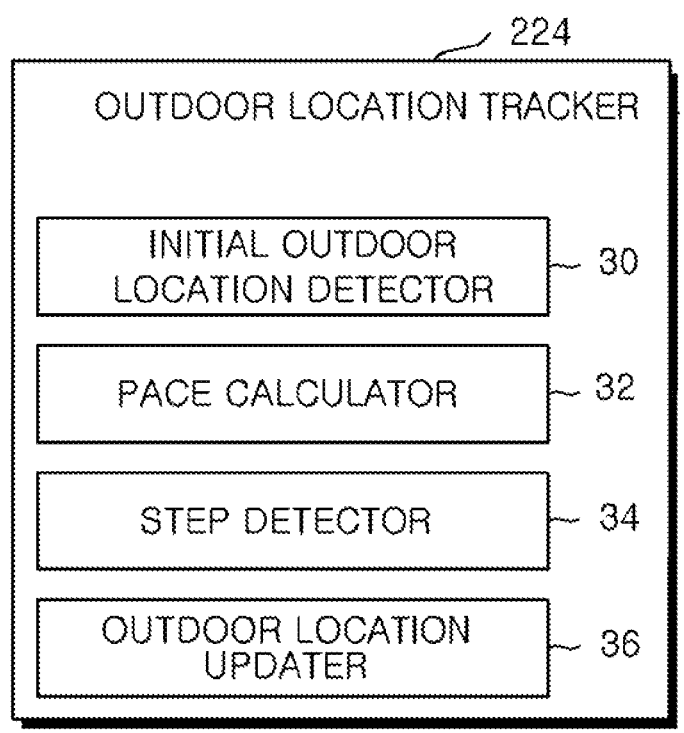
FIG. 13 is a detailed block diagram of an outdoor location tracker shown in FIG. 3.

FIG. 13 is a detailed block diagram of an outdoor location tracker shown in FIG. 3.

When the outdoor location tracker 224 according to an exemplary embodiment of the present invention is set or switched to the outdoor location tracking mode by the mode setting unit 222, it my track a location of the user. The outdoor location tracker 224 may track an outdoor location of the user using a step detection technique and the GPS. To this end, the outdoor location tracker 224 may include an initial outdoor location detector 30, a pace calculator 32, a step detector 34, and an outdoor location updater 36.

The initial outdoor location detector 30 may detect an initial location of the user using the GPS.

The outdoor location tracker 224 according to an exemplary embodiment of the present invention may update the location of the user through step detection in the case of a movement within a radius of less than 20 m from the initial outdoor location detected by the initial outdoor location detector 30, and may update the location through the GPS in the case of a movement of a radius of 20 m or more. Therefore, the outdoor location tracker 224 according to an exemplary embodiment of the present invention may calculate a displacement of the user from the initial outdoor location through the pace calculator 32 and the step detector 34 so that the location may be updated according to whether the user moves within a radius of less than 20 m from the initial outdoor location. Here, the pace calculator 32 and the step detector 34 may calculate the displacement of the user from the initial outdoor location in the same way as described above with reference to the indoor location tracker 223. The outdoor location updater 36 may determine whether the displacement of the user calculated by the pace calculator 32 and the step detector 34 is within a radius of less than 20 m from the initial outdoor location. When the displacement of the user, calculated by the pace calculator 32 and the step detector 34 is within a radius of less than 20 m from the initial outdoor location, the outdoor location updater 36 may update the outdoor location of the user according to the calculated displacement of the user. When the displacement of the user, calculated by the pace calculator 32 and the step detector 34 is a radius of 20 m or more from the initial outdoor location, the outdoor location updater 36 may detect the location of the user moved from the initial outdoor location using the GPS, and may update the outdoor location of the user with the moved location detected using the GPS.

When the location tracking system 1, according to an exemplary embodiment of the present invention, senses that the user moves from the outside to the inside of the building through the outdoor location tracker 224, the mode setting unit 222 may switch the location tracking mode from the outdoor location tracking mode to the indoor location tracking mode.

Specifically, while updating the outdoor location of the user, the outdoor location updater 36 may receive AP signal intensity information from the mobile terminal 100. The outdoor location updater 36 may determine whether an AP signal intensity received from the mobile terminal 100 is identical to an AP signal intensity corresponding to a door node which distinguishes between the inside and the outside of a building. When the AP signal intensity received from the mobile terminal 100 is identical to an AP signal intensity corresponding to a door node which distinguishes between the inside and the outside of a building, the outdoor location updater 36 may transmit a notification signal indicating that the user moved from the outside to the inside of the building to the mode setting unit 222. When the notification signal indicating that the user moves from the outside to the inside of the building is received from the outdoor location updater 36, the mode setting unit 222 may switch the location tracking mode of the location tracking system from the outdoor location tracking mode to the indoor tracking mode.

A location tracking method according to an exemplary embodiment of the present invention will be described below with reference to FIGS. 14A to 14E.

Figure 14A:
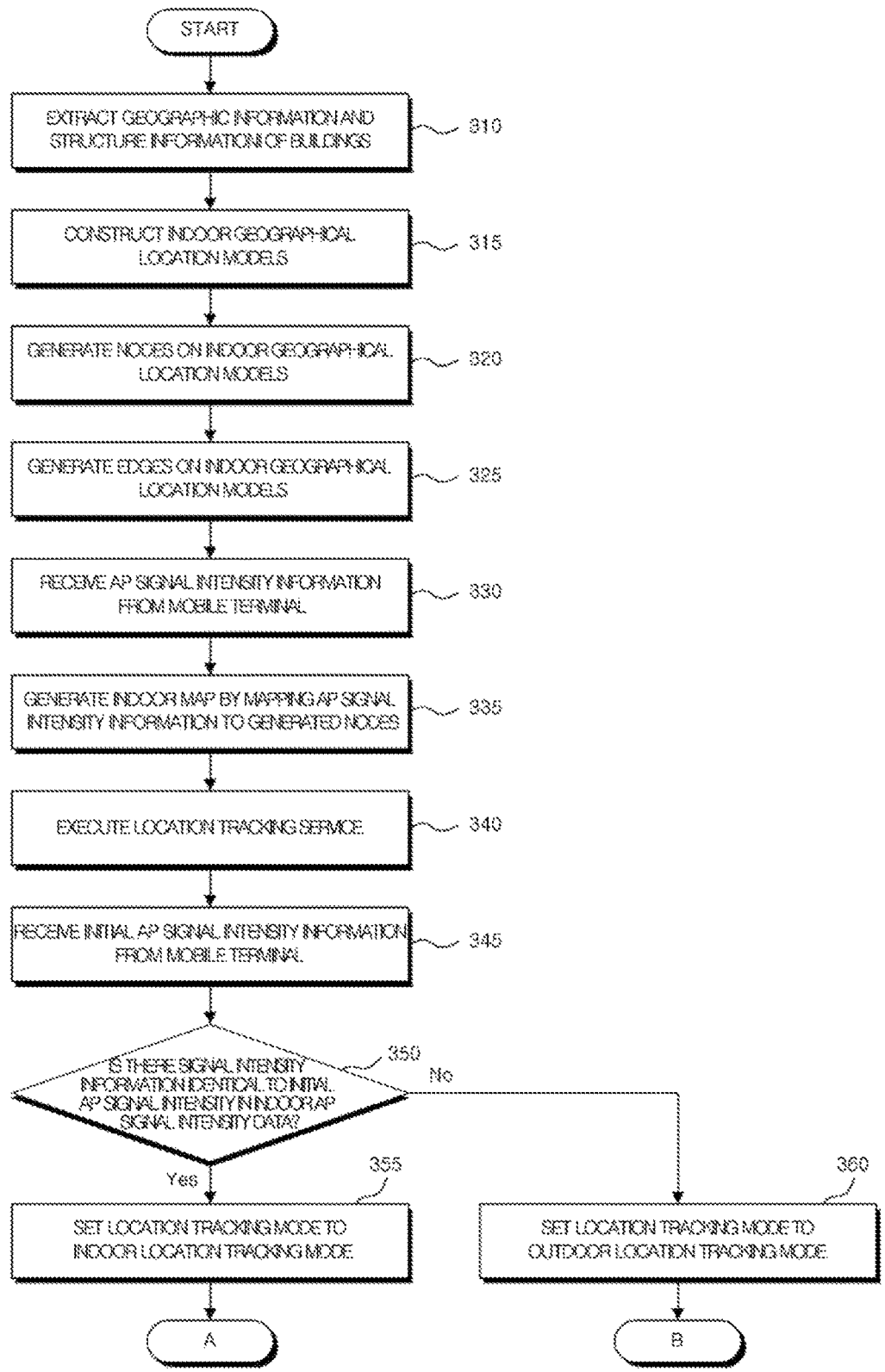
FIGS. 14A to 14E are flowcharts illustrating a location tracking method according to an exemplary embodiment of the present invention.

Referring to FIG. 14A, the location tracking system 1 according to an exemplary embodiment of the present invention may generate indoor maps of indoor areas which cannot be tracked using a GPS to track a location of a user both indoors and outdoors.

To this end, the location tracking system 1 extracts geographic information and structure information of buildings pre-stored in the server memory 230 (310).

Here, the geographic information of the buildings is information which may be extracted from a map of an outdoor location tracking service currently in practical use. By extracting geographical location information, size information, and shape information of the buildings from the buildings shown on the map of the outdoor location tracking service, the geographic information of the buildings can be extracted. Also, the structure information of the buildings is information on designed inner structures of the buildings and may be information which is measured in advance and provided by the user or constructors.

Using the extracted geographic information and structure information of the buildings, the location tracking system 1 constructs indoor geographical location models of the buildings (315).

Here, a process of constructing the indoor geographical location models of the buildings using the extracted geographic information and structure information of the buildings may include an operation of generating virtual external frames of the buildings using the extracted geographic information of the buildings and an operation of constructing indoor geographical location models of the buildings by modeling the insides of the buildings using the structure information of the buildings.

To track an indoor location of the user using the constructed indoor geographical location models, the location tracking system 1 according to an exemplary embodiment of the present invention may display information for tracking the indoor location of the user in a space in which the user can move in the indoor geographical location models.

Specifically, the location tracking system 1 generates two or more nodes at a predetermined distance interval in the space in which the user can move in the indoor geographical location models (320) and generates edges by connecting the generated nodes (325).

Here, the space in which the user can move in the indoor geographical location model may denote an empty space in which there are no obstacles according to indoor structure information. Also, since the indoor geographical location models include actual size and location information of the buildings, location information of generated nodes can be calculated, and direction and distance information of the corresponding edges can be acquired using the location information of the generated nodes.

After generating the edges on the indoor geographical location models (325), the location tracking system 1 receives AP signal intensity information of the insides of the buildings from the mobile terminal 100 (330). The location tracking system 1 extracts an AP signal intensity corresponding to a location of each node from the AP signal intensity information received from the mobile terminal 100, and maps the corresponding AP signal intensity to each node to generate indoor maps (335).

After generating the indoor maps (335), a location tracking service (e.g., a location tracking application) is executed by the user (340). At a point in time when the location tracking service is started by the mobile terminal 100, the location tracking system 1 receives initial AP signal intensity information from the mobile terminal 100 (345), and determines whether there is signal intensity information identical to the received initial AP signal intensity information in indoor AP signal intensity data to determine whether the user is indoors or outdoors (350).

Here, the indoor AP signal intensity data may denote data obtained by collecting and storing AP signal intensity information measured in the operation of generating the indoor maps. Meanwhile, since the indoor AP signal intensity data is classified and stored according to buildings, which building the user is in may be determined using only the AP signal intensity.

When there is signal intensity information identical to the received initial AP signal intensity information in the indoor AP signal intensity data (350), the location tracking system 1 recognizes that the user is indoors and sets a location tracking mode thereof to an indoor location tracking mode (355).

Conversely, when there is no signal intensity information identical to the received initial AP signal intensity information in indoor AP signal intensity data (350), the location tracking system 1 recognizes that the user is outdoors and sets the location tracking mode thereof to an outdoor location tracking mode (360).

Figure 14B:
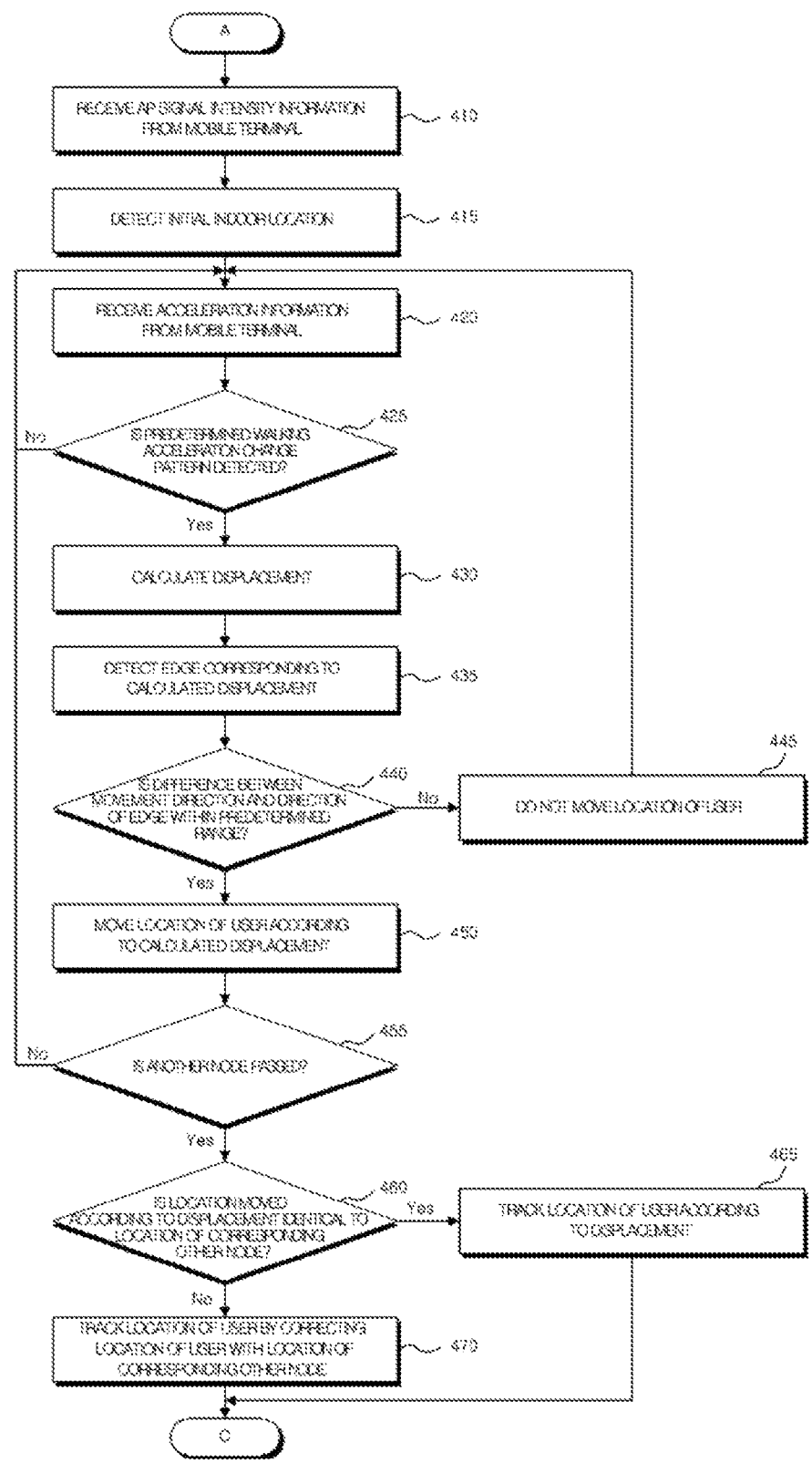

Referring to FIG. 14B, when the location tracking mode of the location tracking system 1 is set to the indoor location tracking mode through FIG. 14A, the location tracking system 1 receives AP signal intensity information from the mobile terminal 100 to detect an initial indoor location of the user (410).

The location tracking system 1 compares the AP signal intensity information received from the mobile terminal 100 with AP signal intensity information mapped to an indoor map to detect the initial indoor location of the user (415).

Here, the initial indoor location of the user may be detected by detecting a node corresponding to the AP signal intensity received from the mobile terminal 100.

After detecting the initial indoor location of the user (415), the location tracking system 1 receives acceleration information of the user from the mobile terminal 100 to detect a movement of the user from the initial indoor location (420).

The location tracking system 1 analyzes the received acceleration information of the user and determines whether a predetermined walking acceleration change pattern is detected in the acceleration information of the user (425).

Here, an operation of determining whether the predetermined walking acceleration change pattern is detected in the acceleration information of the user may be an operation of determining whether a pattern in which a change in acceleration of the user is made in the negative direction of the z-axis is detected after a change in acceleration is made in the positive direction.

When it is determined that the predetermined walking acceleration change pattern is detected in the acceleration information of the user (425), the location tracking system 1 calculates a displacement of the user using the acceleration information of the user (430).

Here, a process of calculating the displacement of the user may include an operation of detecting a movement direction in which the user moves using the acceleration information of the user, an operation of detecting the number of steps of the user through a change in acceleration on the z-axis, an operation of calculating an average pace corresponding to the user according to the sex and height of the user, and a process of calculating a movement distance of the user as a product of the detected number of steps and the calculated average pace to calculate the displacement of the user.

The location tracking system 1 detect an edge along which the user is currently walking using the initial indoor location of the user and the calculated displacement (435), and determines whether a difference between a movement direction according to the calculated displacement and a direction of the detected edge is within a predetermined range (440).

Here, the predetermined range may be an angular range of −45° to +45°.

When it is determined that the difference between the movement direction according to the calculated displacement and the direction of the detected edge exceeds the predetermined range (440), the location tracking system 1 does not move the location of the user (445). Conversely, when it is determined that the difference is within the predetermined range (440), the location tracking system 1 moves the location of the user according to the calculated displacement (450).

When moving the location of the user according to the calculated displacement, the location tracking system 1 determines whether the user passes through another node on the indoor map due to the movement (455).

When it is determined that the user passes through another node (455), the location tracking system 1 determines whether the location of the user moved according to the calculated displacement is identical to a location of the other node (460).

Here, a process of determining whether the location of the user moved according to the calculated displacement is identical to the location of the other node is intended to correct an error which may be caused by moving the location of the user through step detection, that is, according to the calculated average pace of the user.

When the location of the user moved according to the calculated displacement is identical to the location of the other node, the location tracking system 1 recognizes that there is no error in the location of the user moved through step detection and tracks the location of the user by updating the location of the user with the location of the user moved according to the calculated displacement (465).

Conversely, when the location of the user is moved according to the calculated displacement is not identical to the location of the other node, the location tracking system 1 recognizes that there is an error in the location of the user moved through step detection and tracks the location of the user by correcting the location of the user with the location of the other node instead of the calculated displacement (470).

Figure 14C:
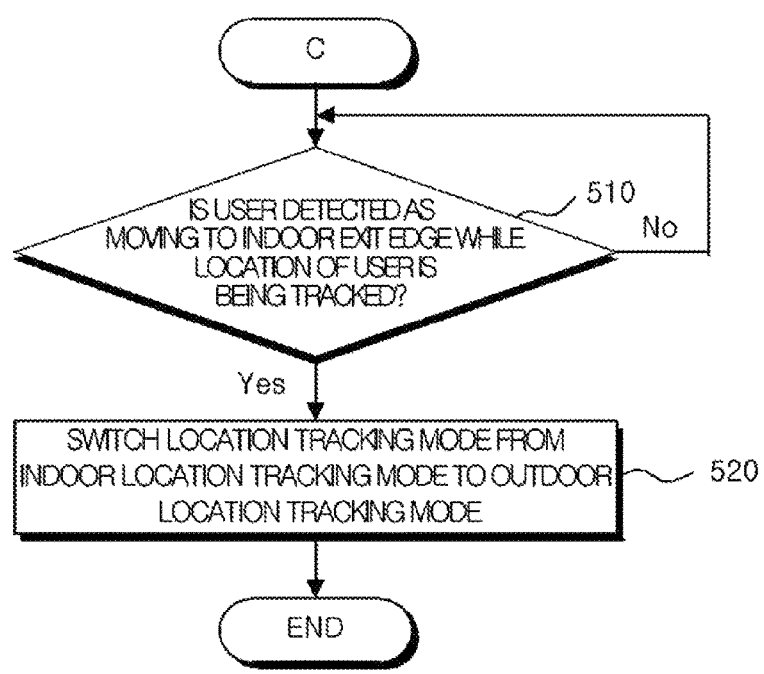

Referring to FIG. 14C, the location tracking system 1 determines whether the user is detected as moving to a preset indoor exit edge while tracking the indoor location of the user (510).

Here, the preset indoor exit edge is an edge pre-generated when the indoor map is generated, and may be an edge connecting a door AP node generated at a door through which it is possible to move from the inside to the outside of a building and an outdoor node generated outside the door (outdoors).

When it is detected that the user moves to the preset indoor exit edge, the location tracking system 1 recognizes that the user moves from the building to the outside and switches the location tracking mode thereof from the indoor location tracking mode to the outdoor location tracking mode (520).

Figure 14D:
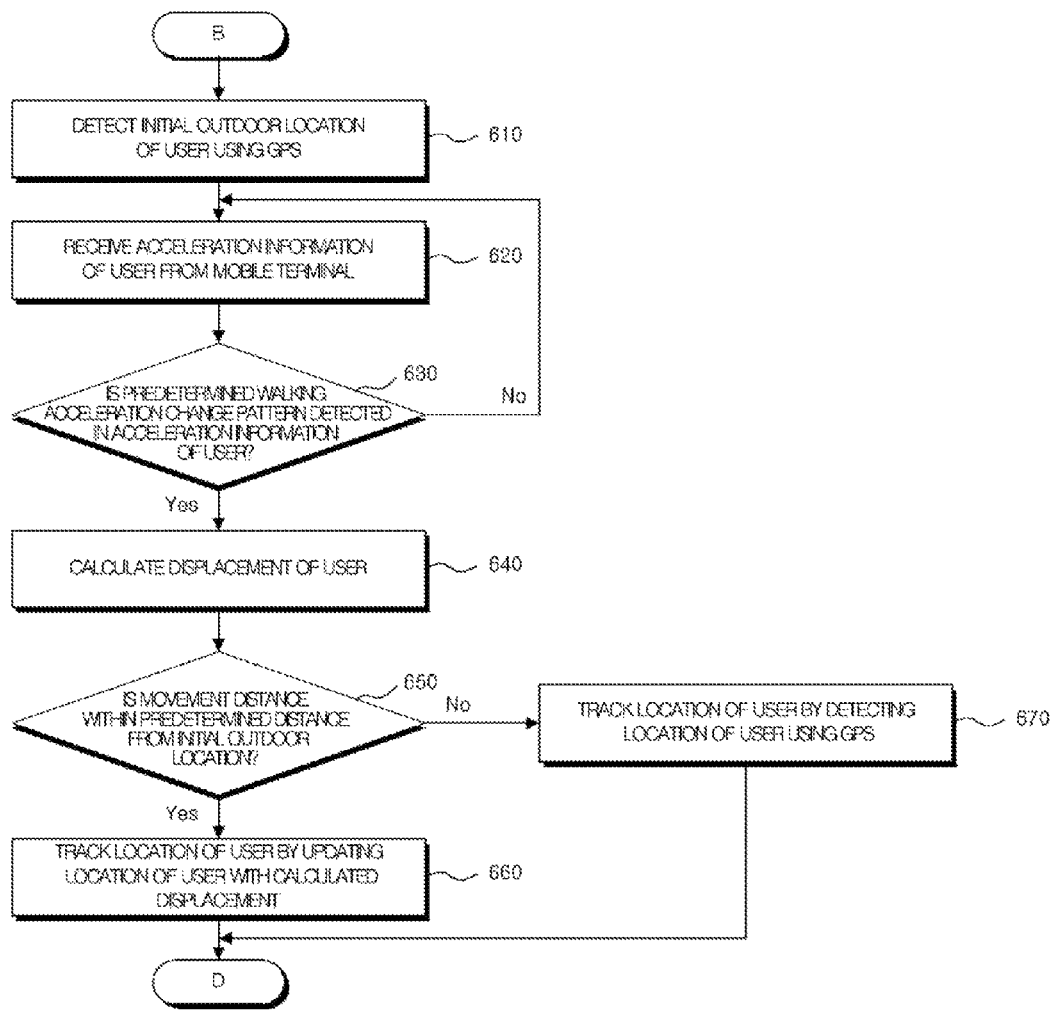

Referring to FIG. 14D, when the location tracking mode of the location tracking system 1 is set to the outdoor location tracking mode through FIG. 14A, the location tracking system 1 first detects an initial outdoor location of the user using the GPS (610).

In the case of tracking the outdoor location of the user, the location tracking system 1 according to an exemplary embodiment of the present invention may track the location of the user through step detection when the user moves within a predetermined distance range from the initial location, and may track the location of the user using the GPS when the user moves outside of the predetermined distance range. Accordingly, the location tracking system 1 may first calculate a movement distance through step detection to determine how far the user moves from the initial location.

The location tracking system 1 receives acceleration information of the user from the mobile terminal 100 (620) and determines whether a predetermined walking acceleration change pattern is detected in the received acceleration information of the user (630).

When the predetermined walking acceleration change pattern is detected in the acceleration information of the user (630), the location tracking system 1 recognizes that the user moves by walking and calculates a displacement of the user (640).

Meanwhile, an operation of calculating the displacement of the user may include an operation of detecting a movement direction in which the user moves using the acceleration information of the user, an operation of detecting the number of steps of the user through a change in acceleration on the z-axis, an operation of calculating an average pace corresponding to the user according to the sex and height of the user, and an operation of calculating a movement distance of the user as a product of the detected number of steps and the calculated average pace to calculate the displacement of the user.

Also, the location tracking system 1 determines whether the movement distance of the user according to the calculated displacement is within the predetermined distance from the detected initial outdoor location (650). When the movement distance of the user is within the predetermined distance from the detected initial outdoor location, the location tracking system 1 tracks the location of the user by updating the location of the user with the calculated displacement (660).

Conversely, when the movement distance of the user exceeds the predetermined distance from the detected initial outdoor location, the location tracking system 1 tracks the location of the user by detecting the location of the user through the GPS (670).

Figure 14E:
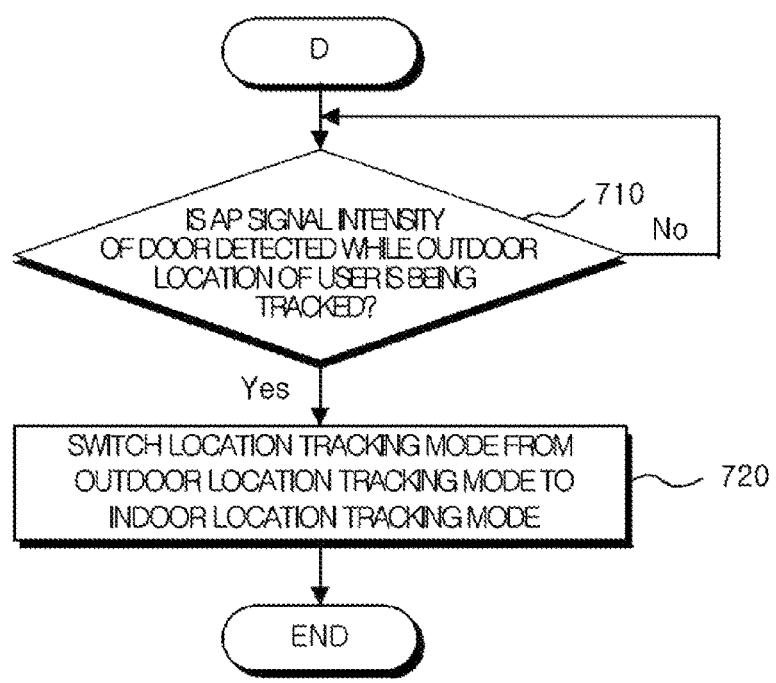

Referring to FIG. 14E, to appropriately switch the location tracking mode according to whether the user moves from the outside to the inside of a building, the location tracking system 1 determines whether an AP signal intensity of a door is detected while the outdoor location of the user is being tracked (710).

Here, a process of determining whether an AP signal intensity of a door is detected may include an operation of generating an AP node at a door through which it is possible to move from the inside to the outside of a building while generating an indoor map, a process of measuring and mapping an AP signal intensity to the location of the generated door AP node through the mobile terminal 100 so that it may be determined whether the AP signal intensity of the door is detected by frequently or periodically checking the AP signal intensity when the mobile terminal 100 is moving.

When it is determined that an AP signal intensity of a door is detected while the outdoor location of the user is being tracked (710), the location tracking system 1 switches the location tracking mode thereof from the outdoor location tracking mode to the indoor location tracking mode (720).

According to an aspect of the present invention described above, regardless of whether a user is indoors or outdoors, a location tracking mode is selected according to a place where the user is, and a location of the user is tracked. Therefore, the location of the user can be accurately estimated both indoors and outdoors.

The above-described technology for tracking a location of a user may be embodied in the form of applications or program instructions executable by various computer components and recorded in a computer-readable recording medium. The computer-readable recording medium may include program instructions, data files, data structures, or the like, solely or in combination.

The program instructions recorded in the computer-readable recording medium may be specially designed or configured for the present disclosure or may be known to and used by those of ordinary skill in the computer software art.

Examples of the computer-readable recording medium include magnetic media such as a hard disk, a floppy disk, and a magnetic tape, optical media such as a compact disc read-only memory (CD-ROM) and a digital versatile disc (DVD), magneto-optical media such as a floptical disk, and hardware devices such as a ROM, a random access memory (RAM), a flash memory, or the like specially configured to store and execute the program instructions.

Examples of the program instructions include a high-level language code executable by a computer using an interpreter or the like as well as a machine language code created by a compiler. The hardware devices may be configured to operate as one or more software modules to perform operations according to the present invention, and vice versa.

It should be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

Applicant hereby expressly disclaims any interpretations of features in the claims under 35 USC 112(f) as "means or step for" features that are limited to corresponding structures, materials, or acts described in the specifications and equivalents thereof.

Applicant hereby defines all features (including structures, materials, or acts) in the claims as having their broadest reasonable interpretation that is consistent with their plain meaning in light of the specification as understood by one of ordinary skill in the art.

For example, "a mobile terminal configured to receive signals . . . " is defined as having its broadest definition to a person of skill in the art. This broadest definition includes: instructions stored in a non-transitory computer readable medium that, when executed by one or more processors, causes the mobile terminal to receive; hardware that causes the mobile terminal to receive; and/or a combination of instructions stored in a non-transitory computer readable medium and hardware that causes the mobile terminal to receive. This broadest definition does NOT include instructions "stored" in a transitory medium such as an electromagnetic signal.

The invention claimed is:

1. A method for tracking locations of a person, the method comprising:
building an indoor map having a plurality of nodes, each of the plurality of nodes capable of indicating access point (AP) signal intensities;
determining whether said person is inside or outside of a building through the plurality of nodes a node in the indoor map to set a location tracking mode and switching the location tracking mode between an indoor location tracking mode and an outdoor location tracking mode based on the determination, wherein the plurality of nodes includes a first door node located at a first door, a first associated door node located on a first side of the first door, and a second associated door node located on a second side of the first door, and
tracking a location of said person according to the set location tracking mode, the indoor location tracking mode comprising:
generating an edge having a direction and a distance between two nodes of the plurality of nodes,
detecting an initial indoor location with AP signal intensity information and correcting the initial indoor location by using a step of the said person,
comparing a direction of the edge and a direction of the step of the said person, and
updating the first indoor location when a difference in angle between the direction of the edge and the direction of the step is in a predetermined angle range; and
the outdoor location tracking mode comprising:
detecting an initial outdoor location of said person using a global positioning system (GPS); and
updating the initial outdoor location with acceleration information.

2. The method of claim 1, wherein the building the indoor map having the plurality of nodes covering where said person moves inside of the building comprises:
extracting indoor geographic information and indoor structure information from pre-stored geographical map information;
constructing an indoor geographical location model of the inside of the building using the indoor geographic information and the indoor structure information;
detecting a space in which said person moves on the indoor geographical location model using the indoor structure information; and
building the indoor map by generating the plurality of edges in the detected space.

3. The method of claim 2, wherein each of the plurality of edges in the detected space is generated by:
providing the two arbitrary nodes in the detected space;
providing a connection line connecting the two nodes;
acquiring location information of the two nodes using the indoor geographic information;
calculating a distance between the two arbitrary nodes based on the acquired location information; and
generating the edge based on a direction of the connection line and the calculated distance between the two arbitrary nodes.

4. The method of claim 2, wherein the building the indoor map having the plurality of nodes covering where said person moves inside of the building further comprises:
- detecting AP signal intensities corresponding to the plurality of nodes on the indoor geographical location model; and
- mapping the detected AP signal intensities corresponding to the plurality of nodes on the indoor geographical location model to build the indoor map.

5. The method of claim 1, wherein the determining of whether said person is inside or outside of the building through the plurality of nodes comprises:
- receiving initial AP signal intensities;
- determining whether there is AP signal intensities identical to the initial AP signal intensities in the AP signal intensities mapped to the indoor map;
- determining that said person is indoors when there is AP signal intensities identical to the initial AP signal intensities in the AP signal intensities mapped to the indoor map; and
- determining that said person is outdoors when there is no AP signal intensities identical to the initial AP signal intensities in the AP signal intensities mapped to the indoor map.

6. The method of claim 1, wherein the set location tracking mode is the indoor location tracking mode.

7. The method of claim 6, wherein the tracking the location of said person in the indoor location tracking mode comprises:
- receiving initial indoor AP signal intensities at a point in time when starting to track the location of said person in the indoor location tracking mode;
- detecting an initial node indicating an initial indoor location of said person by comparing the AP signal intensities mapped to the indoor map with the initial indoor AP signal intensities;
- receiving acceleration information and determining whether said person moves; and tracking the location of said person by calculating a displacement of said person's movement.

8. The method of claim 7, wherein the tracking the location of said person by calculating the displacement of said person's movement comprises:
- calculating the displacement of said person's movement by measuring a direction and distance of the movement;
- detecting the edge corresponding to the displacement of said person's movement based on the initial node of the user;
- calculating the difference in angle between the direction of the displacement and the direction of the detected edge;
- determining whether the calculated difference is within a predetermined range; not updating the location of said person when the calculated difference exceeds a predetermined range; and
- updating the location of said person based on the displacement of said person's movement when the calculated difference is within the predetermined range.

9. The method of claim 8, wherein the calculating the displacement of said person's movement by measuring the direction and distance of the movement comprises measuring paces and steps of said person's movement.

10. The method of claim 8, wherein the updating the location of said person based on the displacement of said person's movement comprises:
- determining whether said person passes another node on the indoor map due to the movement according to the displacement of said person's movement;
- determining whether the location moved according to the displacement of said person's movement is identical to a location of the other node when said person passes the other node; and
- correcting the location of said person with the location of the other node to track the location of said person when the location moved according to the displacement is not identical to the location of the other node.

11. The method of claim 7, further comprising:
- determining whether said person moves to a preset indoor exit edge generated as the first door node while tracking the location of said person; and
- when said person moves to the preset indoor exit edge, recognizing that said person moves from the inside to the outside of the building,
- switching the location tracking mode from the indoor location tracking mode to the outdoor location tracking mode, and
- tracking the location of said person.

12. The method of claim 1, wherein the set location tracking mode is the outdoor location tracking mode.

13. The method of claim 12, wherein the tracking locations of said person in the outdoor location tracking mode comprises:
- receiving acceleration information and determining whether said person moves; and
- tracking the location of said person by calculating a displacement of said person's movement.

14. The method of claim 13, wherein the tracking the location of said person by calculating the displacement of said person's movement comprises:
- calculating the displacement of said person's movement by measuring a direction and distance of the movement;
- determining whether a distance moved by said person from the initial outdoor location of said person according to the displacement of said person is within a predetermined distance;
- tracking the location of said person by moving the location of said person according to the displacement of said person's movement when the distance moved by said person from the initial outdoor location of said person is within the predetermined distance; and
- tracking the location of said person using the GPS when the distance moved by said person from the initial outdoor location of said person exceeds the predetermined distance.

15. The method of claim 1, further comprising:
- determining whether an AP signal intensity corresponding to a preset door node is detected while tracking an outdoor location of the user; and
- recognizing that said person moves from the outside to the inside of the building, switching the location tracking mode from the outdoor location tracking mode to the indoor location tracking mode, and tracking the location of said person when the AP signal intensity corresponding to the preset door node is detected.

16. The method of claim 1, wherein the predetermined angle value is in a range of −45° to 45°.

17. A non-transitory computer readable medium for executing a method for tracking locations of a person, the method comprising:

generating an indoor map having a plurality of nodes, each of the plurality of nodes capable of indicating access point (AP) signal intensities;

determining whether said person is inside or outside of a building through the plurality of nodes in the indoor map to set a location tracking mode and switching the location tracking mode between an indoor location tracking mode and an outdoor location tracking mode based on the determination thereof, wherein the plurality of nodes includes a first door node located at a first door, a first associated door node located on a first side of the first door, and a second associated door node located on a second side of the first door, and tracking a location of said person according to the set location tracking mode, the indoor location tracking mode comprising:

generating an edge having a direction and a distance between two nodes of the plurality of nodes, detecting an initial indoor location with AP signal intensity information and correcting the initial indoor location by using a step of the said person, comparing a direction of the edge and a direction of the step of the said person, and updating the first indoor location when a difference in angle between the direction of the edge and the direction of the step is in a predetermined angle range; and the outdoor location tracking mode comprising:

detecting an initial outdoor location of said person using a global positioning system (GPS); and updating the initial outdoor location with acceleration information.

18. The non-transitory computer readable medium of claim 17, wherein the predetermined angle value is in a range of −45° to 45°.

\* \* \* \* \*